(12) United States Patent
Watson

(10) Patent No.: US 9,162,131 B1
(45) Date of Patent: Oct. 20, 2015

(54) GOLF VISUAL TRAINING AID AND FEEDBACK DEVICE

(71) Applicant: Edwrad Bates Watson, Long Beach, CA (US)

(72) Inventor: Edward Bates Watson, Long Beach, CA (US)

( * ) Notice: Subject to any disclaimer, the term of this patent is extended or adjusted under 35 U.S.C. 154(b) by 0 days.

(21) Appl. No.: 14/710,026

(22) Filed: May 12, 2015

Related U.S. Application Data

(63) Continuation-in-part of application No. 14/447,032, filed on Jul. 30, 2014.

(51) Int. Cl.
*A63B 69/36* (2006.01)

(52) U.S. Cl.
CPC ......... *A63B 69/3632* (2013.01); *A63B 69/3614* (2013.01); *A63B 2207/02* (2013.01); *A63B 2208/0204* (2013.01)

(58) Field of Classification Search
USPC .......... 473/215, 226, 227, 231, 234, 238, 257
See application file for complete search history.

(56) References Cited

U.S. PATENT DOCUMENTS

| | | | | |
|---|---|---|---|---|
| 3,298,693 A | * | 1/1967 | Eisenberg | 473/238 |
| 5,009,426 A | * | 4/1991 | Cox | 473/227 |
| 5,294,126 A | * | 3/1994 | Armstrong, III | 473/227 |
| 5,904,624 A | * | 5/1999 | Martinez | 473/212 |
| 6,722,999 B1 | * | 4/2004 | Yi | 473/238 |
| 6,872,149 B1 | * | 3/2005 | Devon | 473/231 |
| 7,749,093 B1 | * | 7/2010 | Chang et al. | 473/226 |
| 8,894,503 B2 | * | 11/2014 | Dandrea | 473/226 |

* cited by examiner

*Primary Examiner* — Nini Legesse

(57) ABSTRACT

A visual reference and feedback device for use with a golf club is presented. The visual reference and feedback device includes a clubface reference head and a neck that connects a supporting body to the clubface reference head. The supporting body includes three supporting members having a first supporting member, a second supporting member, and a third supporting member. C-clip fasteners may be formed at distal ends of the first supporting member and second supporting member. A sternum guide may be formed as a rectangular structure at the outer portion of the first supporting member and proximate to the neck of the visual aid and feedback device.

5 Claims, 18 Drawing Sheets

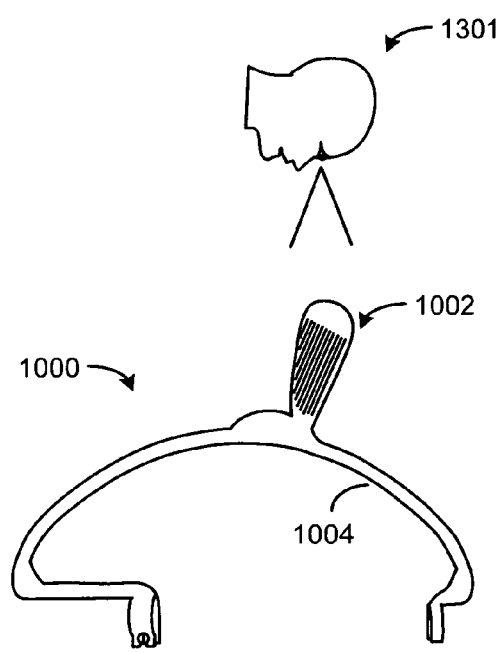
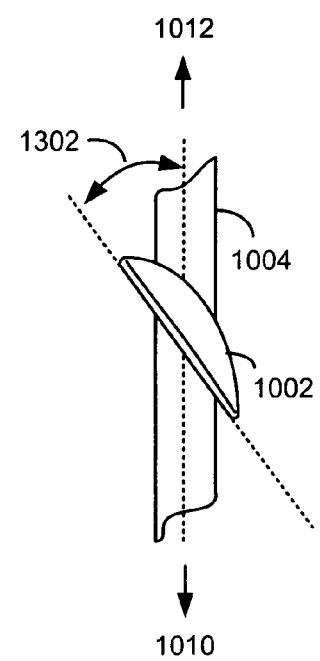
FIG. 13A  FIG. 13B

GOLF VISUAL TRAINING AID AND FEEDBACK DEVICE

RELATED APPLICATION

This application is a continuation-in-part (CIP) of U.S. patent application Ser. No. 14/447,032, filed Jul. 30, 2014, now U.S. Pat. No. 9,126,090. Priority is hereby claimed to the above-identified Application, which is all incorporated by reference as if set forth fully herein.

FIELD OF THE INVENTION

The present invention relates to golf training aid devices. In particular, the present invention relates to golf training aid devices having a visual reference and feedback for use with a golf club.

BACKGROUND

Several conventional golf training aid devices exist for helping a golfer improve their golf swing, thereby improving the stability and accuracy of the golfer's swing. Some of these training aid devices are designed to be attached to golf clubs, while other devices may be worn by the golfer.

Existing golf training aid devices include motion restricting or limiting devices such as, for example, tools that attach to the ends of club grips that guide the hands to be in the proper position, devices that attach to the club grip that sets the wrists during the swing, and clothing that is worn by the golfer's that restricts the golfer's arms to a set position and range of motion. Most of these golf training aid devices generally assist the golfer in improving their accuracy by restricting the movement of the golfer's arms, wrist or hands thereby reducing the golfer's swing variation.

Although these golf training devices may benefit the golfer's posture and swing alignment, other forms of training devices may be beneficial for improving the golfer's swing.

SUMMARY

It is an advantage of the present invention to provide a visual aid and feedback device including a clubface reference head and a neck that connects a supporting body to the clubface reference head.

It is another advantage of the present invention to provide c-clip fasteners formed on the visual aid and feedback device. The c-clips may fit and attach to the grip of the golf club by inserting and snapping the opening of the c-clip directly onto the grip, making it a simple and convenient way to fasten or unfasten the visual aid and feedback device from the grip of the golf club.

It is yet another advantage of the present invention to provide a sternum guide that is formed as a rectangular structure at the outer portion of the first supporting member and proximate to the neck of the visual aid and feedback device.

It is no less another advantage of the present invention to provide various wrist guide designs where each wrist guide design is formed adjacent to the sternum guide and may rest on the inside wrist of the golfer to ensure that the clubface stays in the correct position through the swing of the golfer.

These and other objects, features and advantages of the present invention will become more apparent in light of the following detailed description of preferred embodiments thereof, as illustrated in the accompanying drawings.

BRIEF DESCRIPTION OF THE DRAWINGS

The present invention will be more clearly understood from the following detailed description of the preferred embodiments of the invention and from the attached drawings, in which:

FIG. 13A and FIG. 13B illustrates a top view of the orientation of the clubface reference head of FIG. 10 relative to the supporting body in accordance with an embodiment;

In the appended figures, the same reference numerals may be used in the figures to indicate like features or elements.

DETAILED DESCRIPTION

Properly orientating and positioning a golf club can be challenging and difficult for many golfers. In a typical golf club design, the main parts of the golf club include a grip, a shaft, and a head. The head of the golf club has two sides known as a clubface and a back. In practice, the ideal is to get the clubface to a golf ball perpendicular at impact. With respect to the clubface, it may be difficult to set the proper orientation of the clubface based on the golfer's grip positioning and stance at address position.

Figure 1:
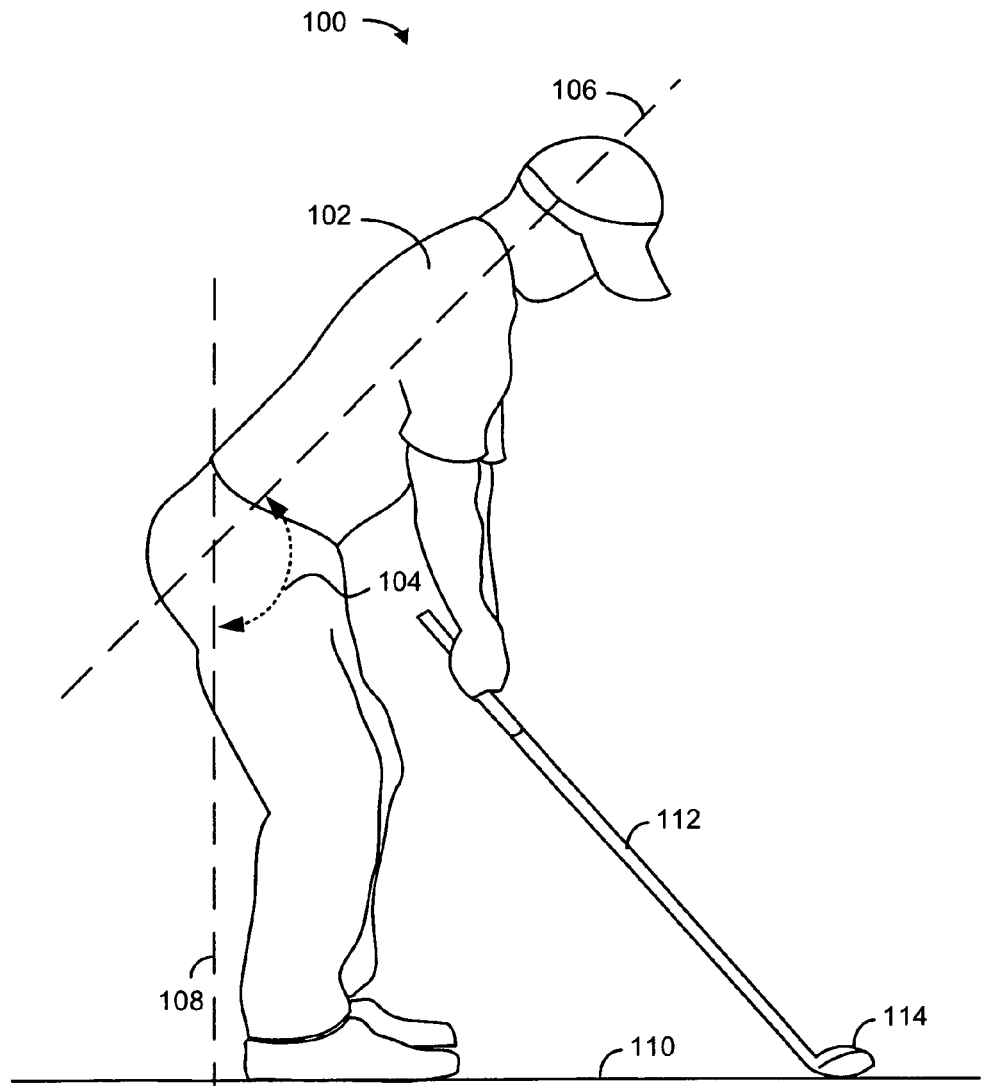
FIG. 1 illustrates a posture and alignment of a golfer gripping a golf club at address position.

Maintaining a proper grip is generally achieved by rotating the clubface to match the orientation of the golfer's torso or spine angle. FIG. 1 illustrates, for example, a golfer 100 having a spine angle 102 defined by an angle formed between the golfer's torso 104 and a perpendicular line 106 relative to the ground 108. The golfer 100 may adjust their spine angle 102 orientation by slightly bending their torso in a forward manner, thereby decreasing the amount of spine angle 102. Thus, with respect to the golfer's spine angle 102, the proper grip orientation of a golf club 110 may be formed when a clubface 112 of the golf club 110 is oriented to closely match the spine angle 102 of the golfer 100.

Figure 2:
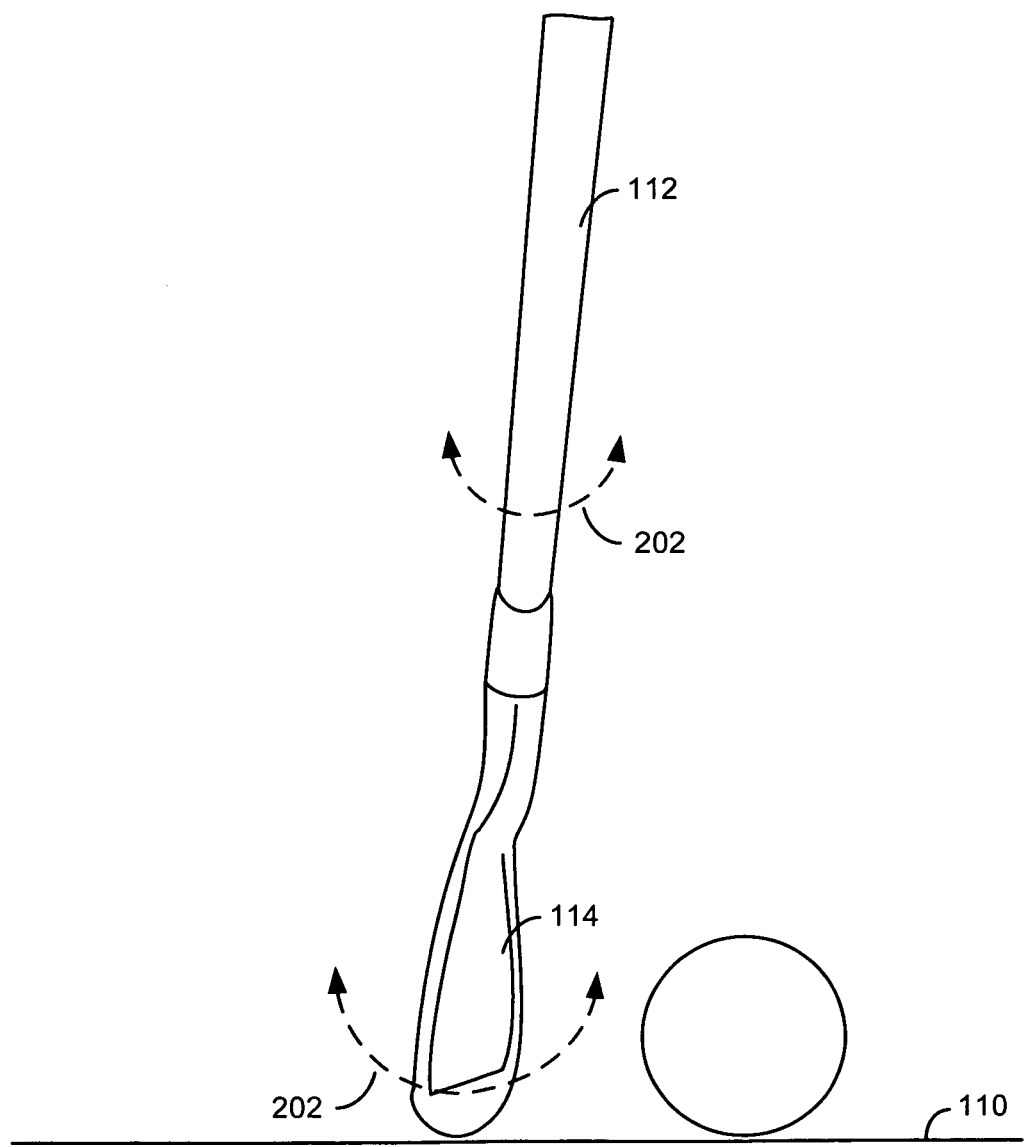
FIG. 2 illustrates a front facing view of the golf club and clubface of FIG. 1.

FIG. 2 illustrates a front facing view of the golf club 110 and clubface 112 of FIG. 1. In this illustration, an angular orientation of the clubface 112 follows the grip orientation of the golfer 100 by rotating the golf club 110 in a clockwise or counter-clockwise manner 202. In practice, the golfer 100 may strike a golf ball 204 using different grip orientations thereby changing the angular orientations of the clubface 112 resulting in various trajectories and paths of the golf ball 204. Preferably, a method for achieving proper control of the trajectory and path of the golf ball 204 is obtained by adjusting the grip orientation of a golf club 110 so that the clubface 112 of the golf club 110 is oriented to closely match the spine angle 102 of the golfer 100. A visual aid and feedback device described herein below may provide and assist the golfer 100 using visual and tactile feedback for achieving the proper grip orientation.

Figure 3:
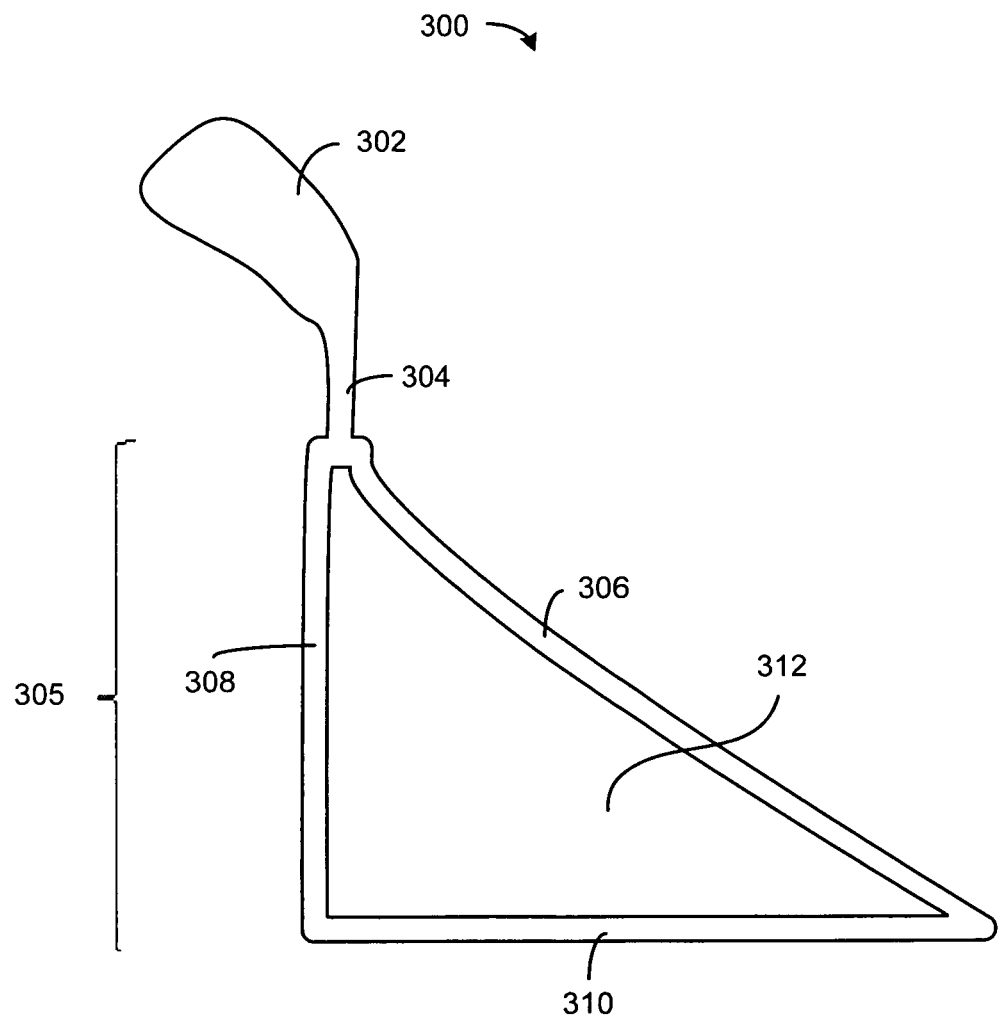
FIG. 3 illustrates a visual aid and feedback device for properly orienting and positioning the clubface of the golf club shown in FIG. 1 in accordance with an embodiment.

FIG. 3 illustrates a first embodiment of a visual aid and feedback device 300 for properly orienting and positioning the clubface of the golf club shown in FIG. 1. The visual aid and feedback device 300 includes a clubface reference head 302 and a neck 304 (or narrow connector) that connects a supporting body 305 to the clubface reference head 302. The clubface reference head 302 may include various golf club designs to match a particular head of the golf club in use. The clubface reference head 302 may also be detachable from neck 304 via a fastener, such as a quick disconnect or bolt and threaded screw design, so that other golf club head designs may be used. The supporting body 305, as shown in this embodiment, includes three supporting members (306, 308, and 310) that is generally in the form of a right triangle having a first supporting member 306 at the hypotenuse side of the triangle, a second supporting member 308 at the perpendicular side (or opposite side) of the triangle, and a third supporting member 310 at the adjacent side 210 of the right triangle. The three supporting members (306, 308, and 310) forms an inner opening 312 that is designed to be large enough to fit one hand of the golfer without interfering with the golfer's swing. Other shapes of the supporting body 305 may include but is not limited to, for example, a rectangular body, other triangular shapes such as is equilateral, isosceles, and scalene triangular shapes, and other polygon shapes.

The visual aid and feedback device 300 is also designed to be lightweight and have a conformable grip so that it may reduce any interference with the golfer's grip position or swing. Injection molding processes, for example, may be used to fabricate the visual aid and feedback device 300 as a single integrated structure using thermoplastics or other molding forming plastics to form a lightweight yet durable part at high production output rates.

Figure 4:
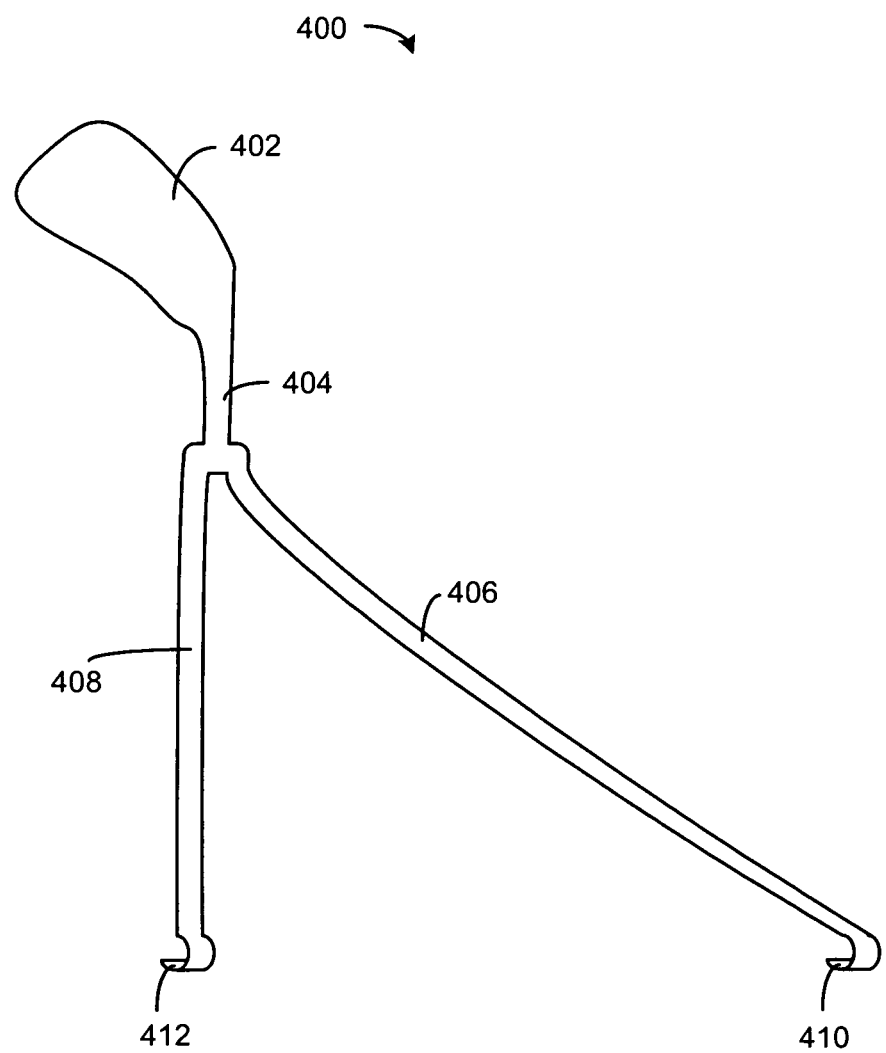
FIG. 4 illustrates a visual aid and feedback device implementing c-clip fasteners in accordance with an embodiment.

FIG. 4 illustrates a second embodiment of a visual aid and feedback device 400. The visual aid and feedback device 400, like the visual aid and feedback device 300 of the first embodiment, includes a clubface reference head 402, a neck 404 (or narrow connector), a first supporting member 406 and a second supporting member 408 which generally perform the same function as described in the device 300 of the first embodiment. For example, like the first embodiment, the clubface reference head 402 in the second embodiment may be detachable from neck 404 using a fastener so that other golf club head designs may be used.

In FIG. 4, c-clips (410, 412) are formed at distal ends of the first supporting member 406 and second supporting member 408, respectively. The c-clips are designed to fit and attach to the grip of the golf club by inserting and snapping the opening of the c-clip directly onto the grip, making it a simple and convenient way to fasten or unfasten the visual aid and feedback device 400 from the grip of the golf club. Other fasteners may include but is not limited to, for example, hook and loop fasteners, retaining rings, straps, and clamps.

Figure 5:
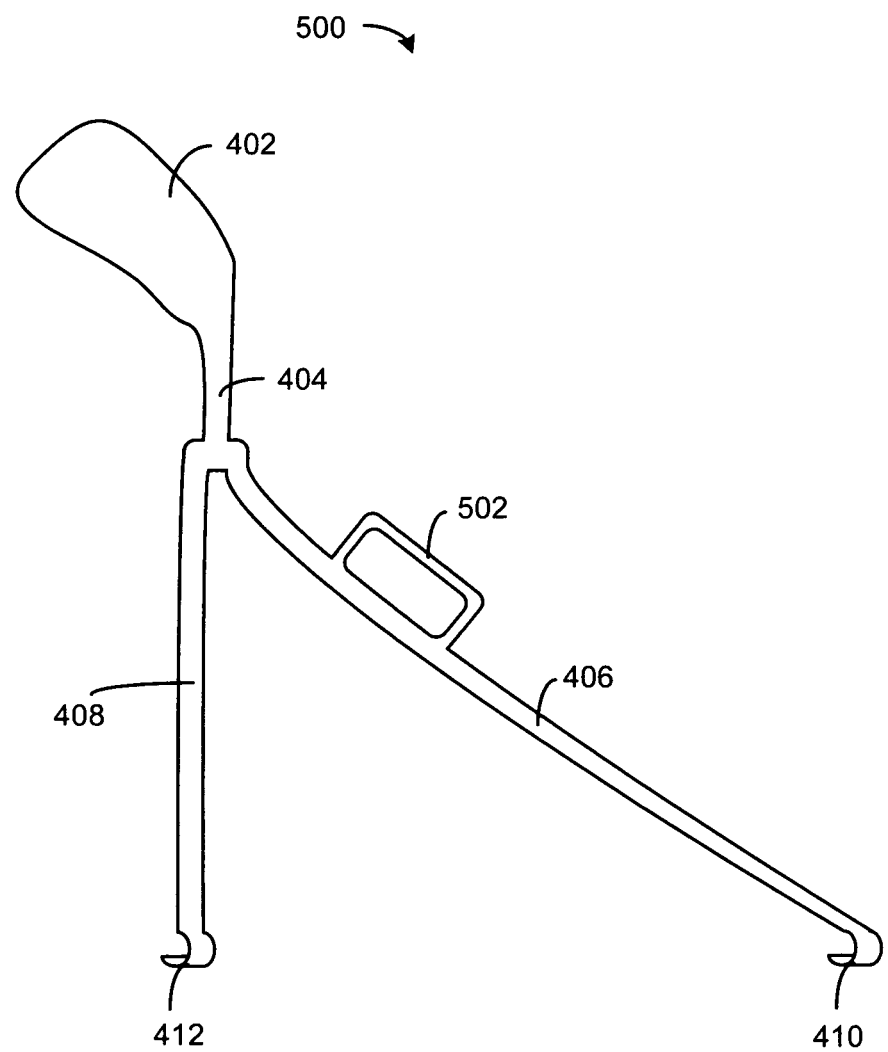
FIG. 5 illustrates a visual aid and feedback device having a sternum guide in accordance with an embodiment.

FIG. 5 illustrates a third embodiment of a visual aid and feedback device 500 which includes several elements of the second embodiment of the visual aid and feedback device 400 previously presented hereinabove. Similar components are designated with the same reference numerals described in the previous embodiment shown in FIG. 4. As illustrated in FIG. 5, a sternum guide 502 is formed as a rectangular structure at the outer portion of the first supporting member 406 and proximate to the neck 404 of the visual aid and feedback device 500. In practice, the sternum guide provides a second visual aid for the golfer and connection to a chest strap described later herein below. In addition, the sternum guide 502 may be integrated with the first supporting member 406 as a unitary structure or attached separately to the first supporting member 406 using c-clips, hook and loop fasteners, retaining rings, straps, and clamps.

Figure 6:
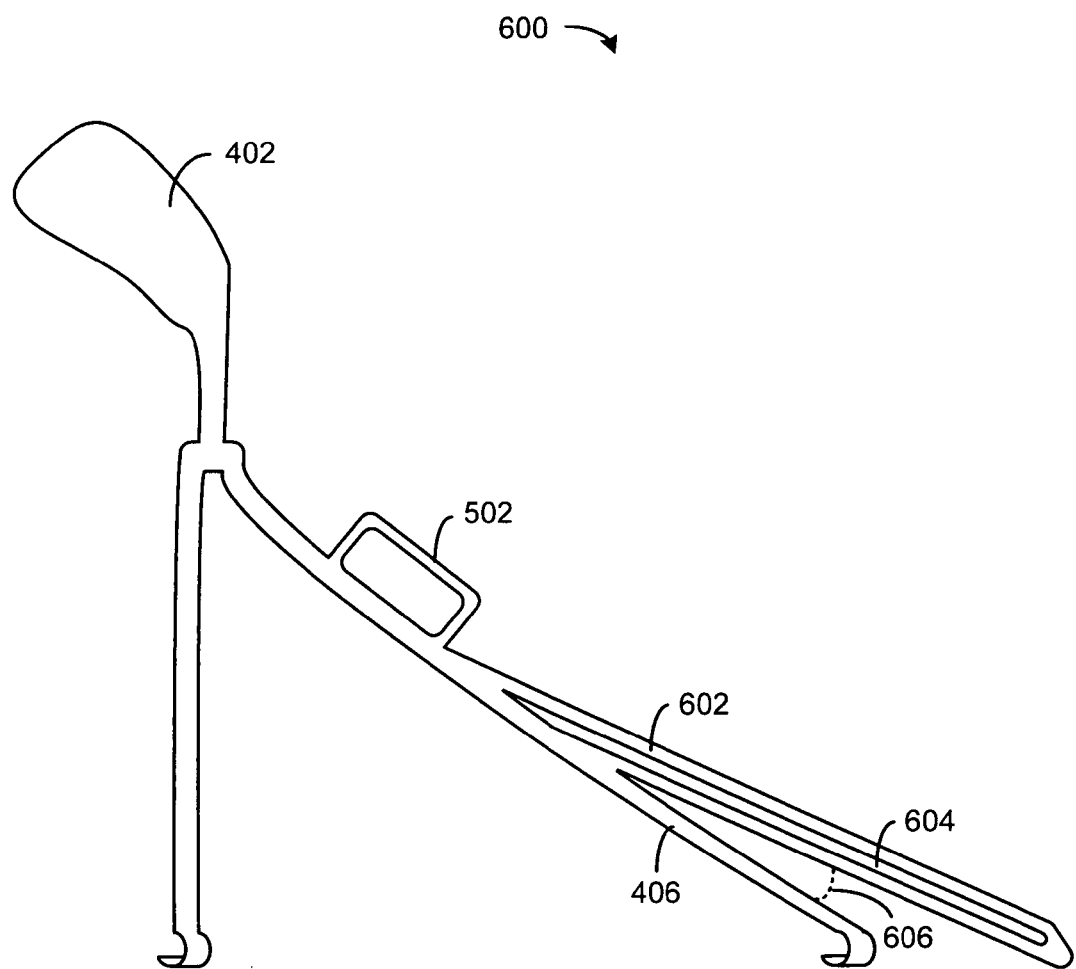
FIG. 6 illustrates a visual aid and feedback device having an elongated slanted wrist guide structure in accordance with an embodiment.

FIG. 6 illustrates a fourth embodiment of a visual aid and feedback device 600 which includes several components of the third embodiment of the visual aid and feedback device 500 previously presented hereinabove. In the fourth embodiment, the visual aid and feedback device 600 includes a wrist guide 602 that is formed on the first supporting member 406 and adjacent to the sternum guide 502 of the visual aid and feedback device 600. The wrist guide 602 includes an elongated slanted structure that forms a slot 604 that is parallel to the longitudinal side of the wrist guide 602. In addition, the wrist guide 602 is oriented in such a way that an acute angle 606 is formed between the wrist guide 602 and the first supporting member 406 as shown in FIG. 6. In practice, the wrist guide may provide tactile feedback to the golfer by making physical contact with the golfer's wrist. When the golfer performs a back swing, the wrist guide 602 may be used throughout the back swing to keep the club face square (in relation to swing) and the shaft of the golf club on plane. The wrist guide 602 provides tactile feedback and physical sensation on the inside forearm of the golfer's left arm for a right-handed golfer (or on the inside forearm of the golfer's right arm for left-handed golfers) to guide the golfer's golf club up the back swing on plane and ultimately keeping the face angle square. Thus, the golfer may use the tactile feedback and physical sensation from the wrist guide 602 on the golfer's forearm to set the correct position in the back swing.

Figure 7:
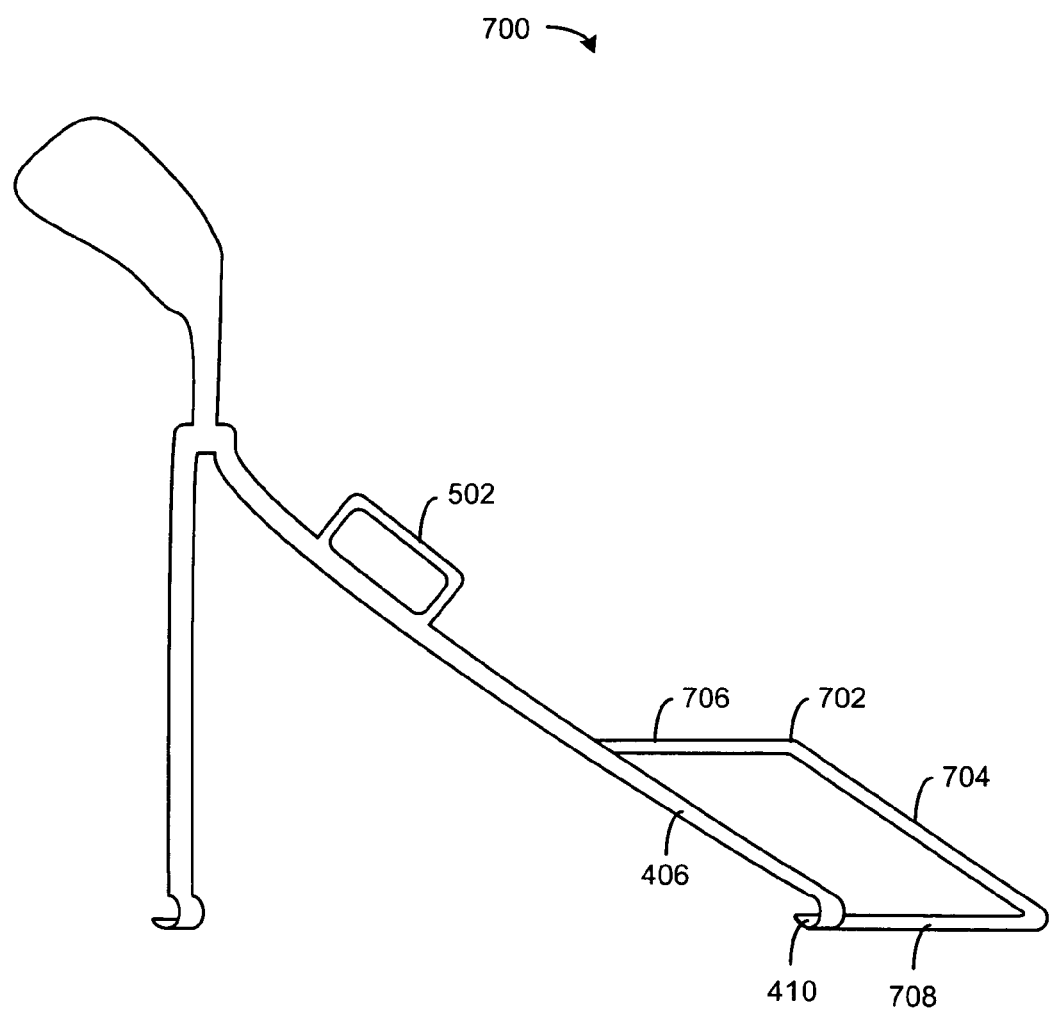
FIG. 7 illustrates a visual aid and feedback device having an extended slanted wrist guide structure in accordance with an embodiment.

FIG. 7 illustrates a fifth embodiment of a visual aid and feedback device 700. In this illustration, a modified wrist guide 702 is presented having similar elements as in the fourth embodiment. The wrist guide 702 includes an extended slanted structure the generally forms a parallelogram having a longitudinal member 704 that runs parallel to the first supporting member 406 and a first short side 706 coupling the first supporting member 406 and with the longitudinal member 704 and a second short side 708 coupling the c-clip 410 of the first supporting member 406 and with the longitudinal member 704. In one application, the parallelogram shaped wrist guide 702 may rest on the inside wrist of the golfer to ensure that the clubface stays in the correct position through the golfer's swing. For example, the wrist guide 702 may be used as a guide to keep the clubface square (in relation to swing) and the golf club shaft on plane. The wrist guide 702 may rest on the inside forearm of the golfer's left arm for right-handed golfers or on the inside forearm of the golfer's right arm for left-handed golfers.

Figure 8:
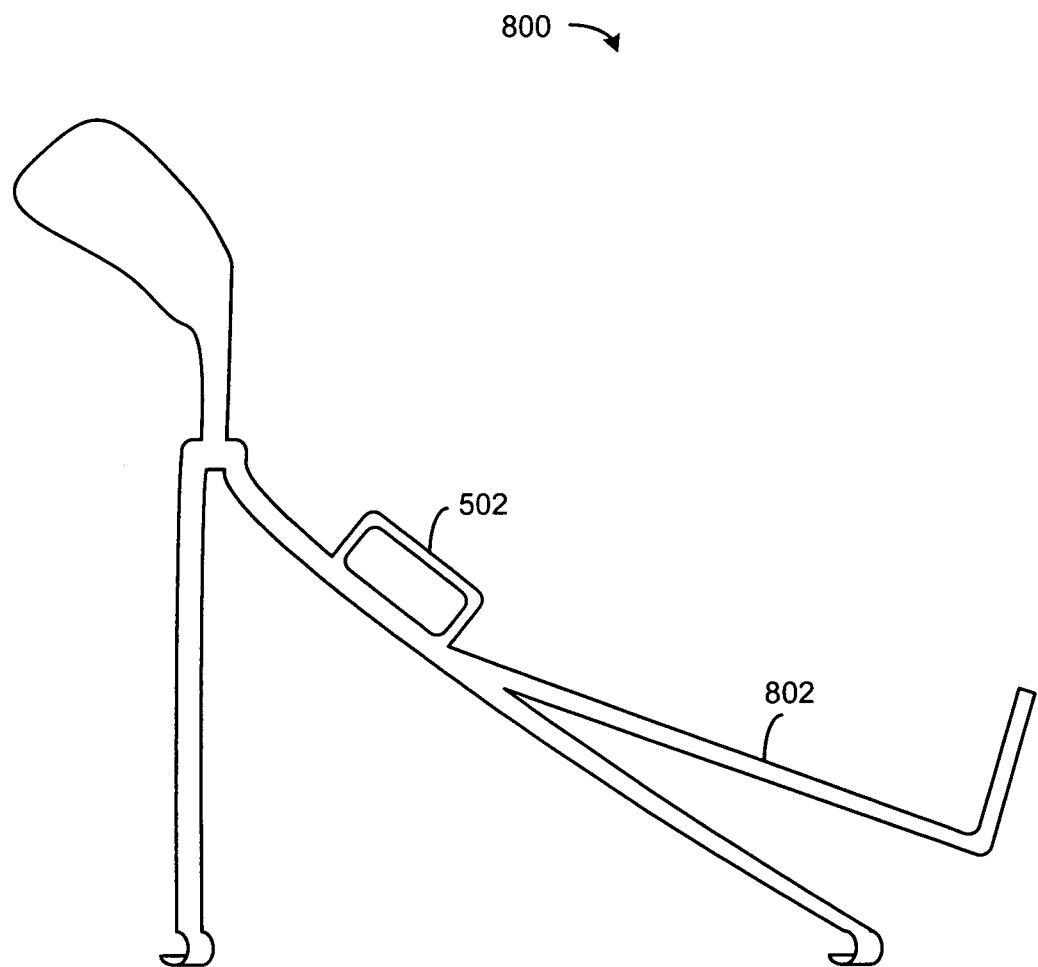
FIG. 8 illustrates a visual aid and feedback device having an L-shaped wrist guide design implementation in accordance with an embodiment.

FIG. 8 illustrates a sixth embodiment of a visual aid and feedback device 800 having an L-shaped wrist guide 802 design. The wrist guide 802 in this embodiment is in the form of an L-shaped structure that is adjacent to the sternum guide 502 of the visual aid and feedback device 800. In addition, the wrist guide 802 in this embodiment is designed to perform the same tactile feedback function as in the previous embodiments presented hereinabove. Although the above embodiments 600-800 present different wrist guide implementations, these embodiments are merely illustrative and may include other designs which perform the same tactile feedback function to the golfer. In addition, elements of the visual aid and feedback devices 600-800 may be formed as a unitary structure using the injection molding processes described hereinabove or as separate elements which may easily attachable and detachable from the visual aid and feedback devices 600-800.

Although the visual aid and feedback devices 600-800 is generally configured for right-handed golfers, a mirrored configuration (not shown) of the visual aid and feedback device may be used to support left-handed golfers. The structural elements, application and use of the mirrored configuration are similar to the embodiments of the visual aid and feedback devices 600-800 described hereinabove.

Figure 9:
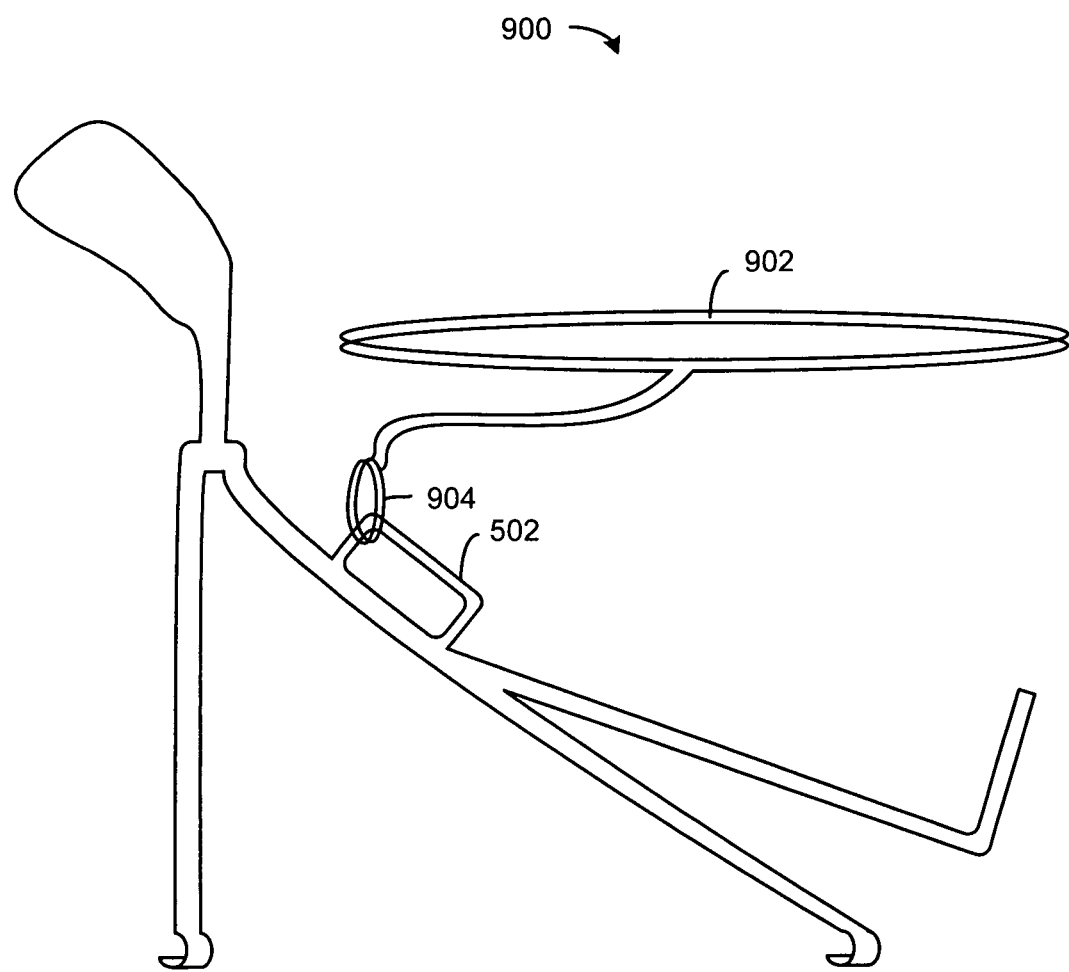
FIG. 9 illustrates a visual aid and feedback device having a chest strap attachment in accordance with an embodiment.

FIG. 9 illustrates a seventh embodiment of a visual aid and feedback device 900. This embodiment includes similar structural elements as described in the sixth embodiment. In addition to these elements, the visual aid and feedback device 900 may include a chest strap 902 which is connected to the sternum guide 502 via a detachable clip 904 such as, for example, a snap hook, a carabiner clip, a d-ring clip, or other similar removable fasteners. The chest strap 902 may be formed from light weight, durable, and elastic material such as rubber, neoprene, and natural or artificial elastic ropes. A golfer may use the chest strap 902 to support the visual aid and feedback device 900 during use and positioning of the device. In addition, the chest strap 902 may serve as a second reference for providing a visual guide to promote a one piece take away. As a visual guide, the chest strap 902 may also assist the golfer in keeping the golf club in front of the golfer's body. Moreover, by keeping tension in the strap, the chest strap 902 may also promote width in the golf swing. In practice, the chest strap 902 may be attached around the golfer's body thereby forcing the body to work as one unit with the visual aid and feedback device 900.

Figure 10:
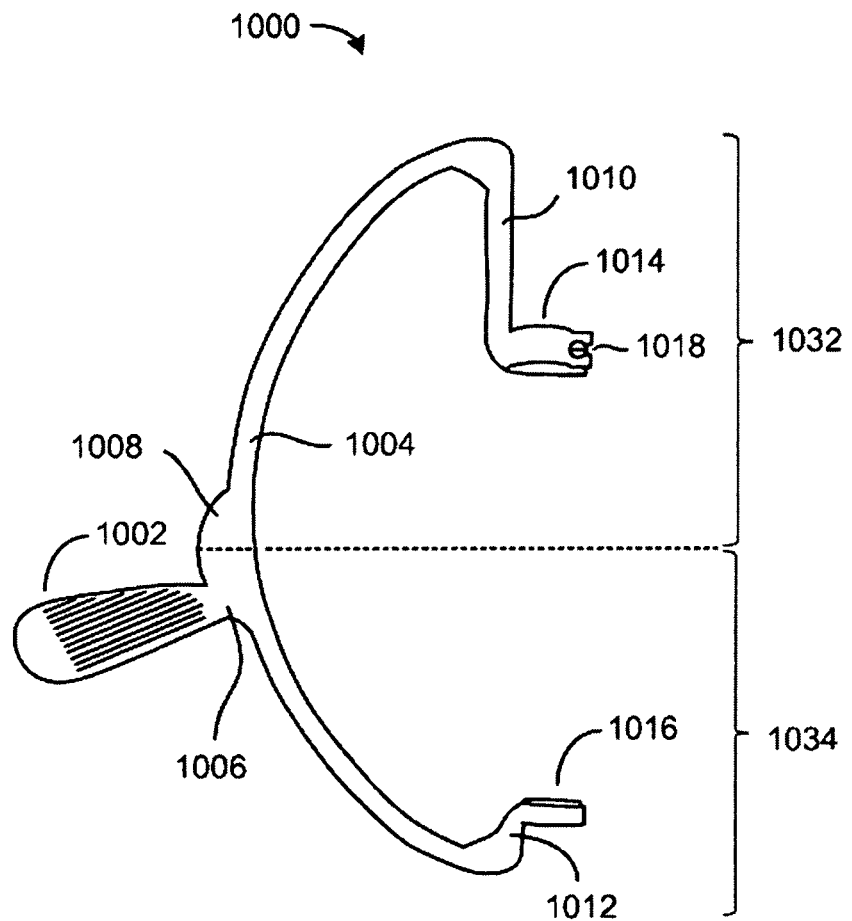
FIG. 10 illustrates a visual aid and feedback device having a curve-shape supporting body and c-clip fasteners in accordance with an embodiment.

FIG. 10 illustrates an eighth embodiment of a visual aid and feedback device 1000. Many of the structural elements in this embodiment are described in the previous embodiments described hereinabove. For example, the visual aid and feedback device 1000 shown in FIG. 10 includes a clubface reference head 1002 similar to the clubface reference heads shown in FIGS. 3-9. In FIG. 10, the clubface reference head 1002 is connected to a curve-shaped supporting body 1004. The supporting body 1004 may have various forms such as, but not limited to, rods, tubes, hollow cylinders, or other similar elongated structures. Materials used to construct the supporting body 1004 may include, but is not limited to, plastics, metals, wood, or other lightweight materials. As with the previous embodiments, the visual aid and feedback device 1000 may include a neck 1006 coupling the clubface reference head 1002 to the supporting body 1004. An extruded base 1008 may be formed between the neck 1006 and the supporting body 1004, providing added reinforcement and strength to the clubface reference head 1002. Lightweight materials such as, but not limited to, plastic, certain metals, wood, or a combination thereof, may be used to construct the extruded base 1008.

Each end of the supporting body 1004 includes attachment parts that provide support and stability to the golf club (not shown). For example, these attachment parts include a first club attachment bar 1010 that is coupled to the first end of the supporting body 1004, and a second club attachment bar 1012 which is coupled to the second end of the supporting body 1004. Each end of the attachment bars (1010, 1012) may include C-clip fasteners (1014, 1016), respectively. Also, each C-clip fasteners (1014, 1016) may be mounted to the grip or shaft of the golf club and locked into place using a locking screw 1018 or similar locking mechanisms. Moreover, the attachment bars (1010, 1012) may be extendable using telescoping arms which may vary the separation between the C-clip fasteners (1014, 1016) in order to accommodate various grips lengths.

Placement of the clubface reference head 1002 is generally positioned near the center of the curve-shaped supporting body 1004 as shown in FIG. 10. In other words, the clubface reference head 1002 is proximate to a midpoint along the supporting member or substantially in between the first and second end of the supporting body 1004. In practice, this placement provides the golfer a view of the clubface reference head which is in direct alignment with the clubface of the golf club, thereby providing a visual reference.

Figure 11:
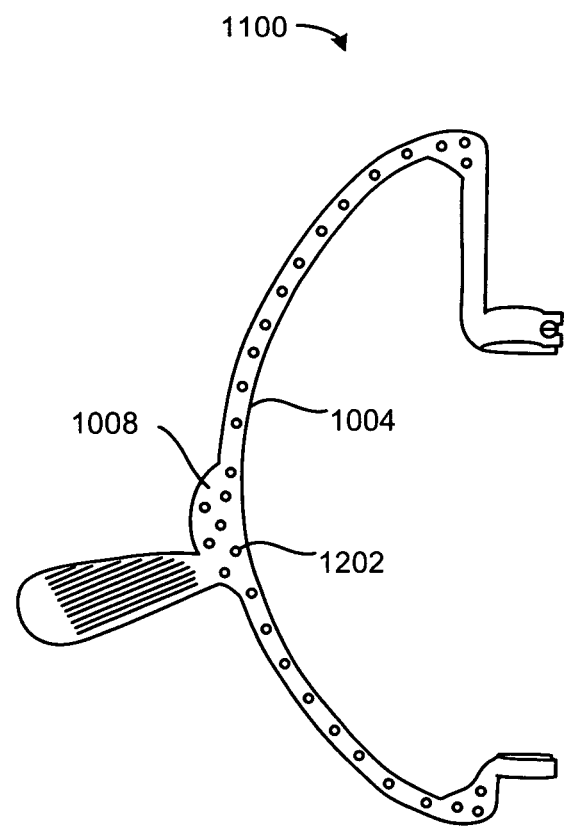
FIG. 11 illustrates a visual aid and feedback device having a supporting body with an aero-dynamic configuration in accordance with an embodiment.

FIG. 11 illustrates a ninth embodiment of a visual aid and feedback device 1100 having the general shape and configuration as the visual aid device in FIG. 10. In this embodiment, however, multiple holes 1202 or slits (not shown) may be formed in the supporting body 1004 and optionally formed in the extruded base 1008 to reduce total weight of the device, reduce drag, and produce an aerodynamic configuration. This example is merely illustrative. Other configurations may contribute to improve the aerodynamics of the device such as, for example, tabs, leading edges, and wings.

Figure 12:
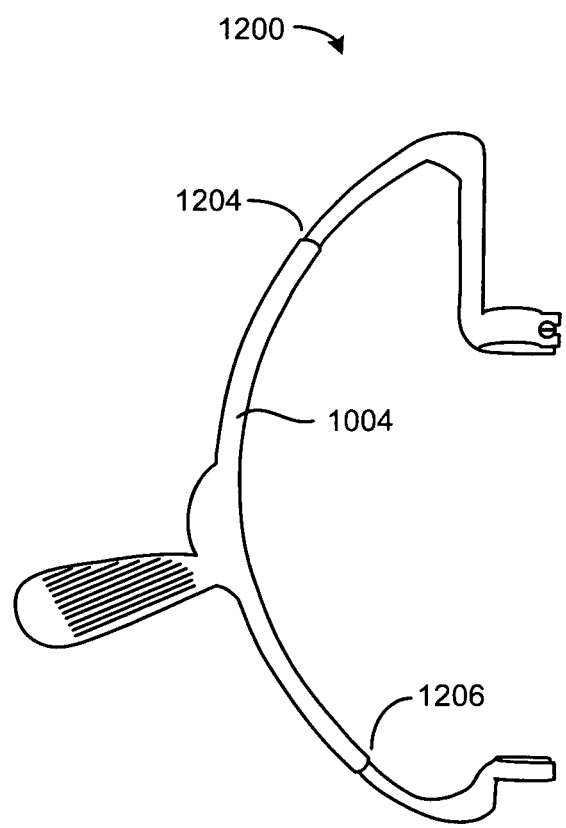
FIG. 12 illustrates a visual aid and feedback device having adjustable arms members within the supporting body in accordance with an embodiment.

FIG. 12 illustrates a tenth embodiment of a visual aid and feedback device 1200 having the general shape and configuration as the visual aid device in FIG. 10. However, in this embodiment, each end of the supporting body 1004 may include retractable arms (1204, 1206) that slide in and out from the supporting body 1004. In other words, each retractable arm (1204, 1206) may slide inward or outward in overlapping sections formed inside a hollow cylinder formed inside the supporting body 1004. This retractable feature makes the overall length of visual aid and feedback device 1000 adjustable, providing a tailored fit for men, women, and children with various arm lengths. A locking mechanism (not shown) may be placed at each end of the retractable arms (1204, 1206) to lock the arms in place. Locking mechanisms may include but is not limited to threaded screws, external clamps, or tapered sleeves.

FIG. 13A illustrates a viewer's reference point 1301 of the clubface reference head 1002 and the supporting body 1004 of FIG. 10. As seen by the viewer's perspective 1301 shown in FIG. 13A, FIG. 13B further illustrates a top view of the clubface reference head 1002 and a portion of the supporting body 1004. Using the supporting body 1004 as a reference, the clubface reference head 1002 may be rotated by angle 1302. Moreover, the angle 1302 may be anywhere between 0 to 360 degrees. In practice, however, the angle is such that the clubface reference head 1002 is offset to the right, (between 30-36 degrees) so that the leading edges of both clubface of the clubface reference head 1002 and clubface of the golf club (not shown) are substantially parallel.

Optional configurations of the visual aid and feedback device described hereinabove may include, but is not limited to, a detachable body having a supporting body that splits into two pieces at the mid-section of the visual aid and feedback device. The detachable body may have sections which are configured to detachably connect to each other such that the supporting body may either be joined as a single piece or separated into two pieces (Piece 1032 and Piece 1034). When the supporting body is detached into two pieces, for example, the first piece 1032 may include the clubface reference head 1002, a first portion of the supporting body 1004, and C-clip fastener 1016, while the second piece 1034 may include a second portion of the supporting body 1004 and the other C-clip fastener 1014. This detachable configuration allows for a compact design for carrying and storage. Other compact design configurations may include, for example, a foldable body by which the supporting body 1004 may bend in half at the extruded base 1008.

As previously mentioned in this document, other shapes of the supporting body as shown in FIG. 3 may be used to form the visual aid and feedback device. These other shapes that form the supporting body may include but is not limited to C-shapes, S-shapes, elliptical-shapes, spirals, zig-zag or meander shapes, or other combinations of linear and non-linear shapes. These examples are merely illustrative. Any suitable shape may be used in forming the supporting body if desired.

In another embodiment, the clubface reference head of the visual aid and feedback device may include an adjustable mechanism provide various angles with respect to the supporting body. The adjustable clubface reference head allows for various angles of the clubface reference head giving the golfer to manually align the clubface reference head with the golf clubface.

In yet another embodiment, a tactile sleeve may be applied around the supporting body. In practice, the tactile sleeve may surround a part of the supporting body that is in contact with the inside arm of the golfer, thereby providing tactile feedback to the golfer. The tactile sleeve may be formed using a variety materials including but not limited to rubber, formed plastics, or other flexible material having a surface suitable for tactile feedback.

Figure 14:
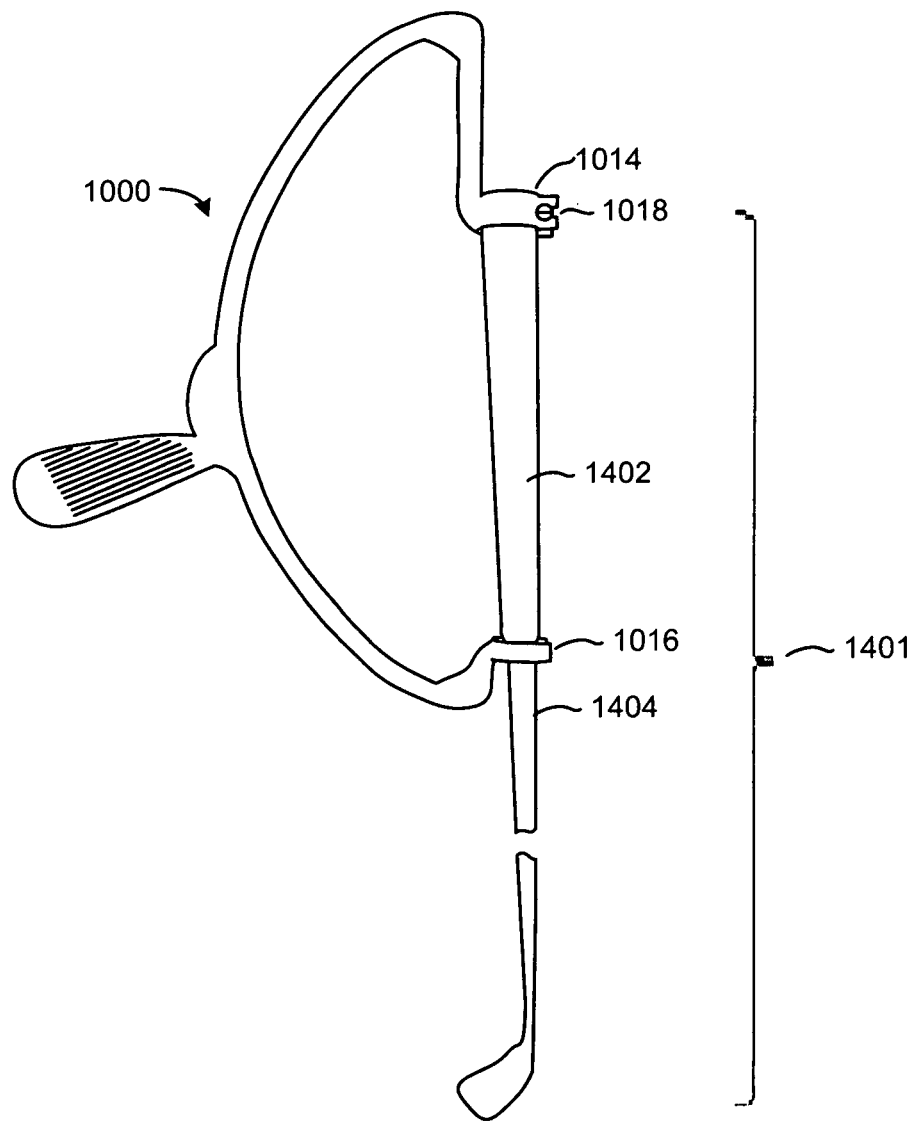
FIG. 14 illustrates the visual aid and feedback device of FIG. 10 as attached to a golf club in accordance with an embodiment.

FIG. 14 illustrates how the visual aid and feedback device 1000 is attached to a golf club 1401. In this example, the C-clip fastener 1014 with locking mechanism 1018 may be attached to a first end of the grip 1402 of the golf club while the other C-clip fastener 1016 may be attached to either another end of the grip 1402 of the golf club 1301 near the shaft 1404 or attached on the shaft 1404 itself. To prevent the visual aid and feedback device 1000 from slippage or rotation, the locking screw 1018 may be tightened to securely fasten the C-clip fastener 1014 to the grip 1402 of the golf club. Although C-clip fasteners are presented in this example, other suitable fasteners may be used in securing the visual aid and feedback device 1000 to the golf club if desired.

Figure 15:
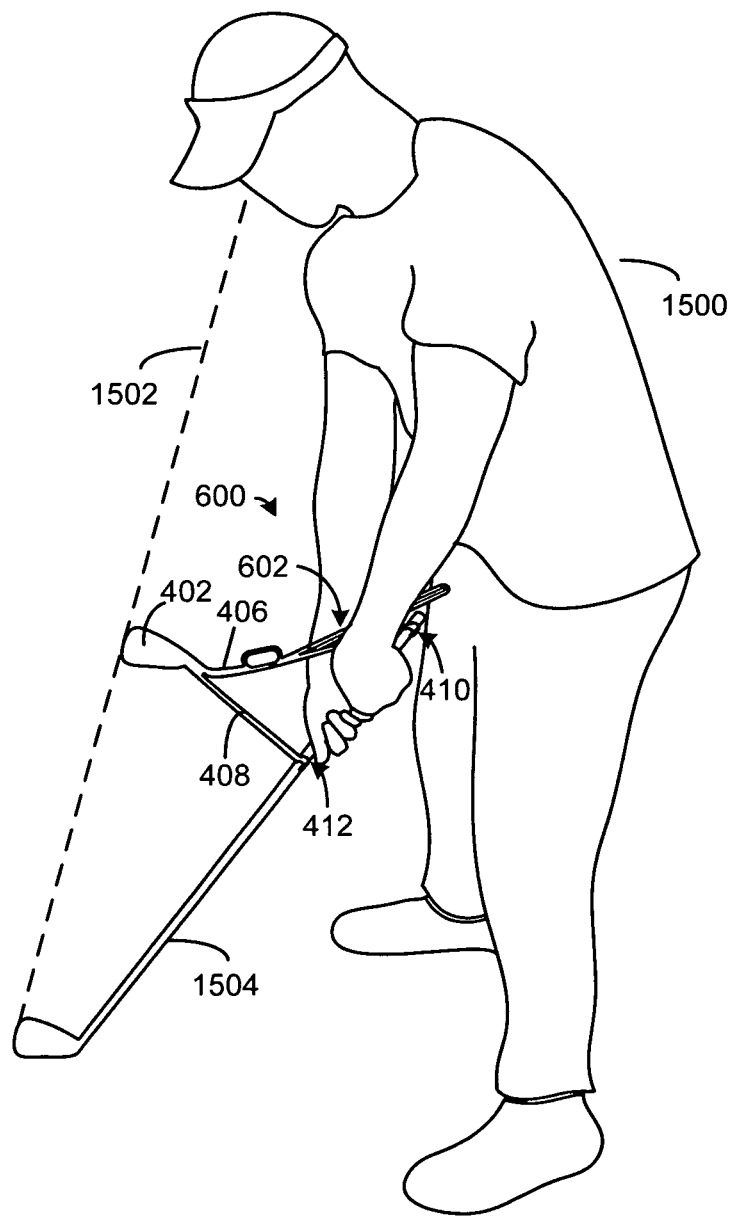
FIG. 15 illustrates a side view of a golfer implementing the visual aid and feedback device of FIG. 6 by attaching it to a golf club.

FIG. 15 illustrates a side view of a golfer 1500 at address position implementing the visual aid and feedback device 600 of FIG. 6 by attaching it to the grip of a golf club 1504 using c-clip 410 and c-clip 412. FIG. 15 further illustrates the proper method of holding the visual aid and feedback device 400 by the golfer. In this illustration, the golfer grips the golf club in between the opening formed by the first supporting member 406 and the second supporting member 408 of the visual aid and feedback device 600 without interfering with the golfer's swing. Note that the visual aid and feedback device 600 is positioned so that it splits the middle of right and left forearms of the golfer 1500. In addition, the golfer 1500 may position the visual aid and feedback device 600 so that the clubface reference head 402 is aligned to the clubface of the golf club 1504. In other words, by using the visual aid and feedback device 400, the golfer may visually line up (at dotted line 1502) the clubface reference head 402 with the clubface of the golf club 1504. Once aligned, the visual aid and feedback device 400 provides a visual reference of the clubface which may be used to set up the proper grip orientation. In practice, the clubface reference head 402 on the visual aid and feedback device 400 matches the clubface on the actual golf club throughout the golfer's swing.

FIG. 15 further illustrates the proper positioning of the wrist guide 602 relative to the golfer's forearms. The wrist guide, in this example, is firmly pressed against the golfer's forearm, providing tactile feedback and physical sensation to the golfer 1500. Subsequently, this feedback may be used by the golfer 1500 to set the correct position in the back swing.

Referring again to FIG. 15, at address position, the golfer positions the visual aid and feedback device 600 so that it splits the middle of the right and left forearms of the golfer.

Figure 16:
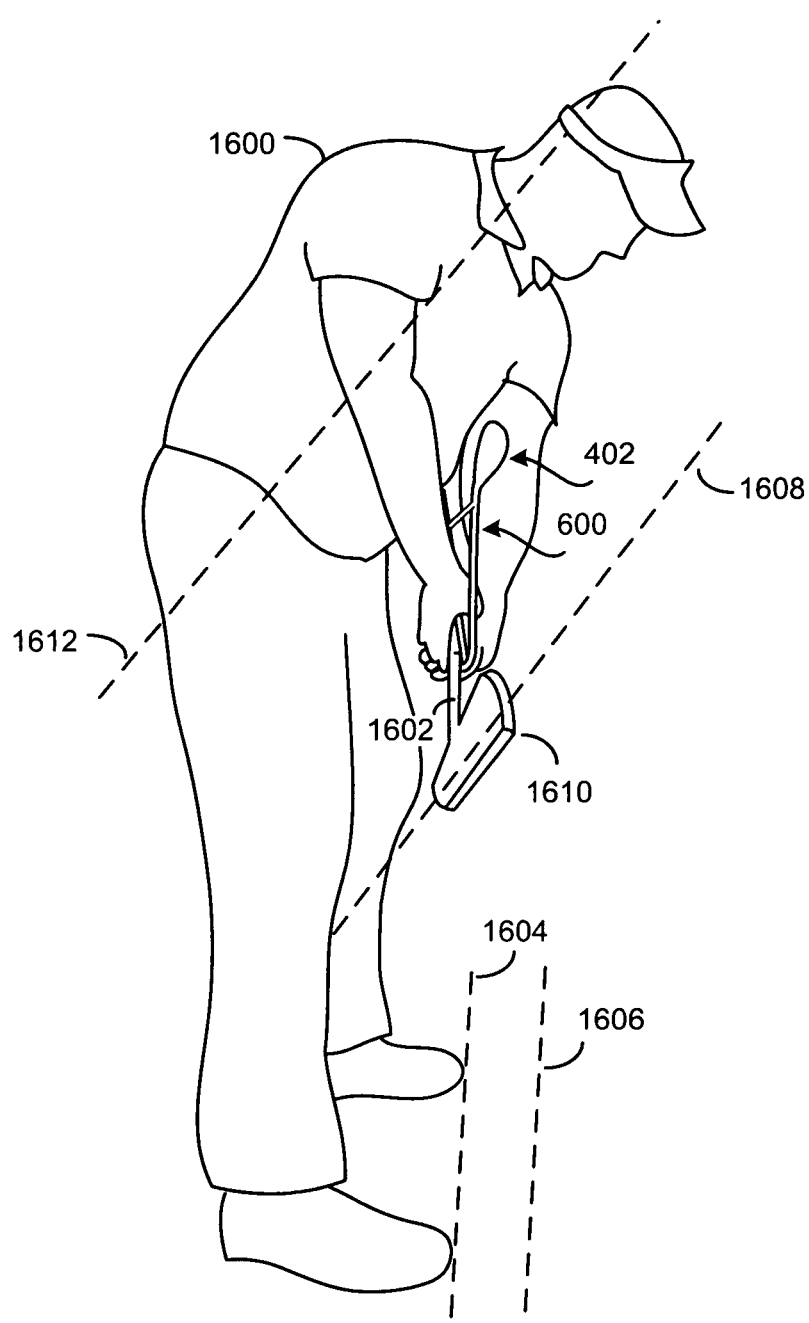
FIG. 16 illustrates a golfer's stance and proper grip of a golf club at a take away position.
Figure 17:
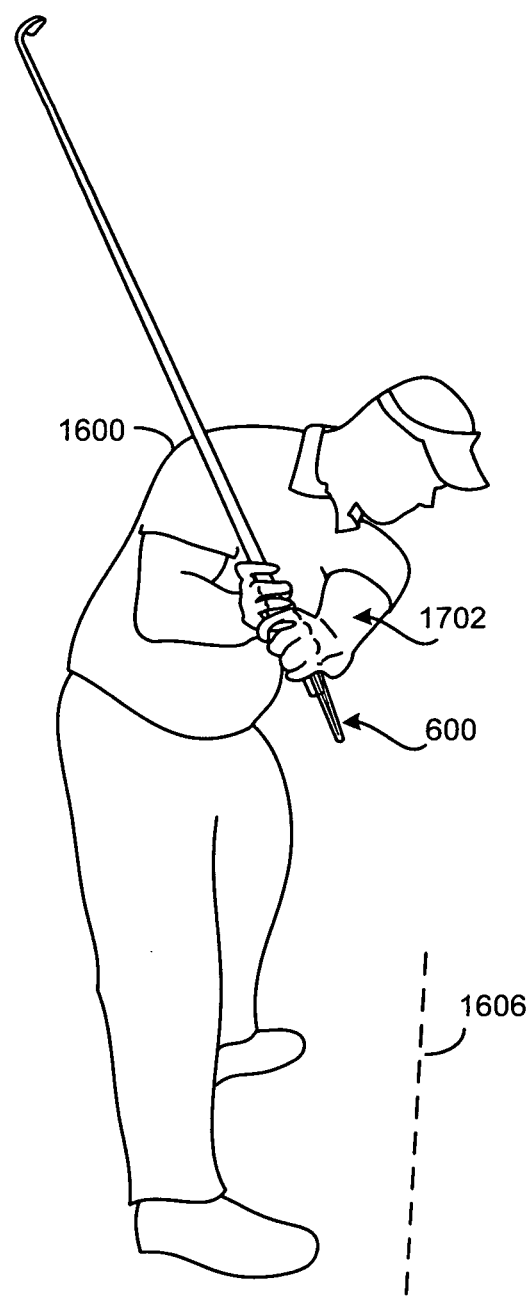
FIG. 17 illustrates a golfer's stance and proper grip of a golf club at a mid-swing position.
Figure 18:
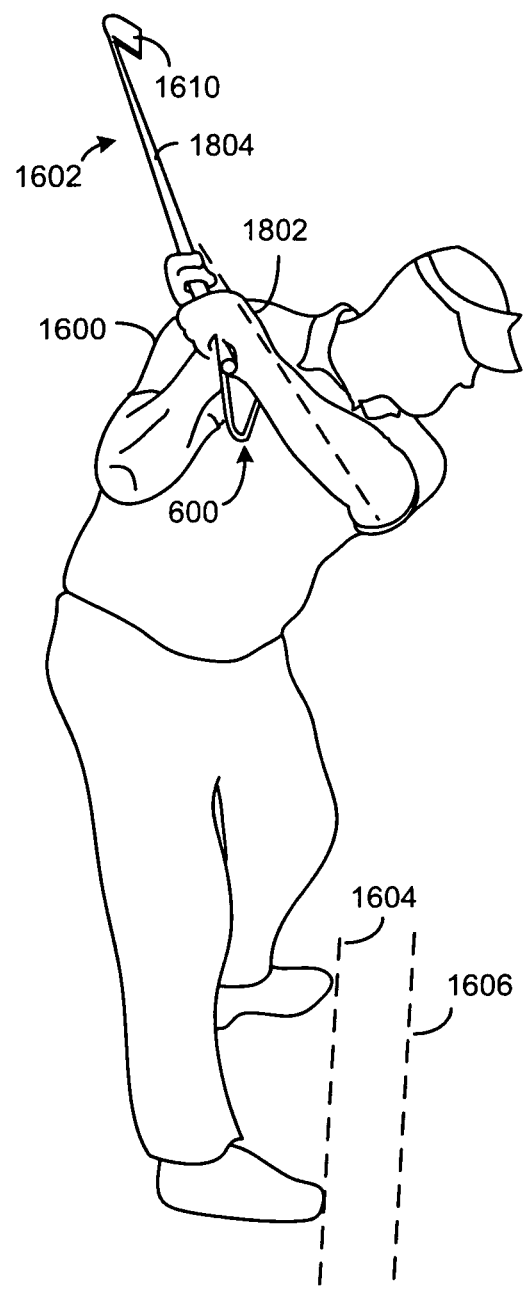
FIG. 18 illustrates a golfer's stance and proper grip of a golf club at a back swing position.

FIGS. 16-18 illustrate various positions and use of the visual aid and feedback device 600 at different golf swing positions by a golfer 1600.

FIG. 16, for example, illustrates a stance and proper grip of a golf club 1602 of a golfer 1600 at a take away position. At take away, the golf club 1602 is positioned so that it is generally parallel to the ground. A shaft angle (not shown) is generally on the toe line 1604 parallel to the ball line 1606 while the clubface angle 1608 of the clubface 1610 is generally parallel to the spine angle 1612. The visual aid and feedback device 600 is position between the golfer's left and right forearms with the clubface reference head 402 pointed upward toward the golfer's head.

FIG. 17 illustrates the proper positioning of the golfer's left arm 1702 which is shown parallel to the ground at mid swing. The shaft angle (not shown) is generally pointing to the ball line 1606. The visual aid and feedback device 600 may be braced up against the left inside part of the forearm 1702 of the golfer. The golfer's hands are generally in the center of the golfer's chest and the right wrist is fully hinged at this point of the golf swing.

FIG. 18 illustrates the top of a back swing of the golfer 1600. The left wrist 1302 (if using a conventional grip) of the golfer 1600 should be flat. At the top of the back swing the golf club 1602 should be at most parallel to the ground (not past parallel) and the shaft 1804 should be parallel to the ball line 1606 and toe line 1604. At back swing, the visual aid and feedback device 600 is still positioned between the golfer's left and right forearms with the clubface reference head 402 pointed upward toward the golfer's chest. It should be noted that although FIGS. 16-18 illustrates various golf swings using the embodiment of the visual aid and feedback device 600, the visual aid and feedback device embodiments 400, 500, and 700 described hereinabove are also applicable and may be used in the different golf swings presented in FIGS. 16-18.

The visual aid and feedback device described hereinabove may also include but is not limited to mechanical, chemical, electrical or wireless feedback mechanisms to enhance the visual quality or tactile feedback. This may include, for example, LED lights, a laser, fluorescent strips or paint, vibrational feedback mechanisms, and surface enhancing materials and agents.

As used in the specification and the appended claims, the singular forms "a", "an", and "the" included plural referents unless the context clearly dictates otherwise.

All patents, patent applications, and other references cited herein are incorporated by reference in their entireties.

It is noted that the foregoing disclosure has been provided merely for the purpose of explanation and is in no way to be construed as limiting of the present invention. Although the present invention has been shown and described with respect to several preferred embodiments thereof, various changes, omissions, and additions to the form and detail thereof, may be made therein, without departing from the spirit and scope of the invention. It is understood that the words which have been used herein are words of description and illustration, rather than words of limitation. Changes may be made, within the purview of the appended claims, as presently stated and as amended, without departing from the scope and spirit of the present invention in its aspects.

Other embodiments and modifications of the present invention may occur to those of ordinary skill in the art in view of these teachings. Accordingly, the invention is to be limited only by the following claims which include all other such embodiments and modifications when viewed in conjunction with the above specifications and accompanying drawings.

What is claimed is what is described and illustrated, including:

1. A golf club training aid device comprising:
    a clubface reference head;
    a supporting body coupled to the clubface reference head;
    a first fastener coupled to a first end of the supporting body; and
    a second fastener coupled to a second end of the supporting body, wherein the clubface reference head is positioned between the first end and the second end of the supporting body, wherein the clubface reference head is rotated at a predetermined angle from the supporting body, wherein the golf club training aid device further comprises a neck coupling the clubface reference head to the supporting body, wherein the golf club training aid device further comprises a first attachment bar coupling the first end of the supporting body to the first fastener, and a second attachment bar coupling the second end of the supporting body to the second fastener, wherein the neck is coupled to a substantially extruded structure formed between the clubface reference head and the supporting body, wherein the first fastener or second fastener includes a locking mechanism, wherein the supporting body is configured to have retractable arms at each end of the supporting body, and wherein each retractable arm slide inward or outward in overlapping sections formed inside a hollow cylinder formed within the supporting body.

2. The golf club training aid device of claim 1 wherein the predetermined angle has a range between 30 to 36 degrees.

3. The golf club training aid device of claim 1 wherein the first and second fasteners are C-clip fasteners.

4. The golf club training aid device of claim 1 wherein the supporting body is substantially in the shape of a curve, wherein the first and second fasteners are attached to the grip of a golf club.

5. The golf club training aid device of claim 1 wherein the supporting body separates into two pieces, wherein the first piece includes the clubface reference head, a first portion of the supporting body, and the first fastener, and the second piece includes a second portion of the supporting body and the second fastener.

* * * * *